(12) United States Patent
Shaffer et al.

(10) Patent No.: US 7,003,086 B1
(45) Date of Patent: Feb. 21, 2006

(54) APPARATUS AND METHOD FOR ALLOCATING CALL RESOURCES DURING A CONFERENCE CALL

(75) Inventors: Shmuel Shaffer, Palo Alto, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 09/766,424

(22) Filed: Jan. 18, 2001

(51) Int. Cl.
*H04M 3/42* (2006.01)
(52) U.S. Cl. .............................. 379/202.01; 379/212.01
(58) Field of Classification Search ........... 379/202.01, 379/212.01; 370/16, 228, 260, 253; 725/109; 348/14.11
See application file for complete search history.

(56) References Cited

U.S. PATENT DOCUMENTS

| | | | | |
|---|---|---|---|---|
| 4,477,895 A | * | 10/1984 | Casper et al. ............... 370/228 |
| 5,467,342 A | * | 11/1995 | Logston et al. ............. 370/253 |
| 5,563,882 A | * | 10/1996 | Bruno et al. ................ 370/260 |
| 5,625,407 A | * | 4/1997 | Biggs et al. ............. 348/14.11 |
| 6,081,513 A | * | 6/2000 | Roy ........................... 370/260 |
| 6,259,785 B1 | | 7/2001 | Shaffer et al. .............. 379/265 |
| 6,275,575 B1 | * | 8/2001 | Wu ....................... 379/202.01 |
| 6,574,216 B1 | * | 6/2003 | Farris et al. ................ 370/352 |
| 6,735,175 B1 | * | 5/2004 | Havens ....................... 370/236 |
| 2002/0006128 A1 | * | 1/2002 | Yehuda et al. ............. 370/390 |
| 2002/0170067 A1 | * | 11/2002 | Norstrom et al. ........... 725/109 |

* cited by examiner

*Primary Examiner*—Ahmad F. Matar
*Assistant Examiner*—Rasha S. AL-Aubaidi
(74) *Attorney, Agent, or Firm*—Baker Botts L.L.P.

(57) ABSTRACT

A method and apparatus for allocating call resources during a conference call are disclosed. A conference call between a plurality of clients is conducted on a first call resource. The clients communicate media streams to the first call resource for mixing. A media gateway identifies a second call resource to conduct the conference call and mix the media streams, and transfers the conference call from the first call resource to the second call resource without suspending communication of a plurality of mixed media streams received by the clients.

31 Claims, 3 Drawing Sheets

APPARATUS AND METHOD FOR
ALLOCATING CALL RESOURCES DURING
A CONFERENCE CALL

TECHNICAL FIELD OF THE INVENTION

This invention relates in general to packet-based communication networks, and more particularly to an apparatus and method for allocating call resources during a conference call.

BACKGROUND OF THE INVENTION

Consumers in business continue to demand more sophisticated communication systems that allow increasing numbers of people to participate in a conference call using audio, video and other data. The conference call may be executed by processors, such as digital signal processors, which create, modify and terminate media streams communicated to the clients participating in the conference call. In conventional systems, each time a conference call is initiated, the processor is allocated to accommodate a conference call having a maximum number of participants. If the conference call has less than the maximum number of participants, the processor may be under-utilized if no additional participants join the conference call. Communication providers face a challenge to provide communication systems that efficiently utilize processors when multiple conference calls occur on a communication network.

SUMMARY OF THE INVENTION

In accordance with the teachings of the present invention, the disadvantages and problems associated with allocating call resources during a conference call have been substantially reduced or eliminated. In a particular embodiment, a method for allocating call resources during a conference call is disclosed that transfers the conference call from a first call resource to a second call resource without suspending mixed media streams communicated by a media gateway to clients participating in the conference call.

In accordance with one embodiment of the present invention, a method for allocating a plurality of call resources during a conference call includes conducting a conference call between a plurality of clients using a first call resource and identifying a second call resource available to conduct the conference call. The method also includes transferring the conference call from the first call resource to the second call resource without suspending communication of a plurality of mixed media streams received by the clients.

In accordance with another embodiment of the present invention, a communication system for allocating a plurality of call resources during a conference call includes a first call resource, a second call resource, a plurality of clients and a media gateway coupled to a packet-based network. The plurality of clients initiate or join the conference call using the first call resource. The first and second call resources couple to the network at different physical locations. The media gateway transfers the conference call from the first call resource to the second call resource without suspending communication of a plurality of mixed media streams received by the clients.

In accordance with a further embodiment of the present invention, a media gateway for allocating a plurality of call resources during a conference call includes an interface for coupling to a communication network and for receiving media streams communicated by a plurality of clients participating in the conference call. A processing module couples to the interface and transfers the conference call from a first call resource to a second call resource without suspending communication of a plurality of mixed media streams received by the clients.

Important technical advantages of certain embodiments of the present invention include a media gateway that transfers a conference call between call resources without notifying clients participating in the conference call that the conference call has been transferred to another call resource. When the conference call is transferred, the media gateway modifies the mixed media streams received from the new call resource to match the mixed media streams received from the original call resource. The transfer, therefore, is transparent to the clients because the media gateway ensures that the media streams communicated and received by the clients remain connected during the transfer.

Another important technical advantage of certain embodiments of the present invention includes a media gateway that directs media streams communicated by clients participating in a conference call to call resources distributed across a communication network. If the media gateway receives a request to initiate an additional conference call on the call resource, the media gateway determines if the additional conference call may be conducted on the call resource. If the number of participants in the original conference call changes, the media gateway determines which conference call may be transferred. The media gateway bases its determination on the number of participants that are in each conference call, the amount of time that each conference call has been in session, and the available call resources coupled to the network. The media gateway, therefore, eliminates or reduces under-utilization of the call resources if multiple conference calls are being conducted on the network. In a particular embodiment, the media gateway allows participants to be added to a conference by transferring the conference to another call resource with sufficient processing capacity.

Other technical advantages will be readily apparent to one skilled in the art from the following figures, descriptions, and claims.

DETAILED DESCRIPTION OF THE INVENTION

Figure 1:
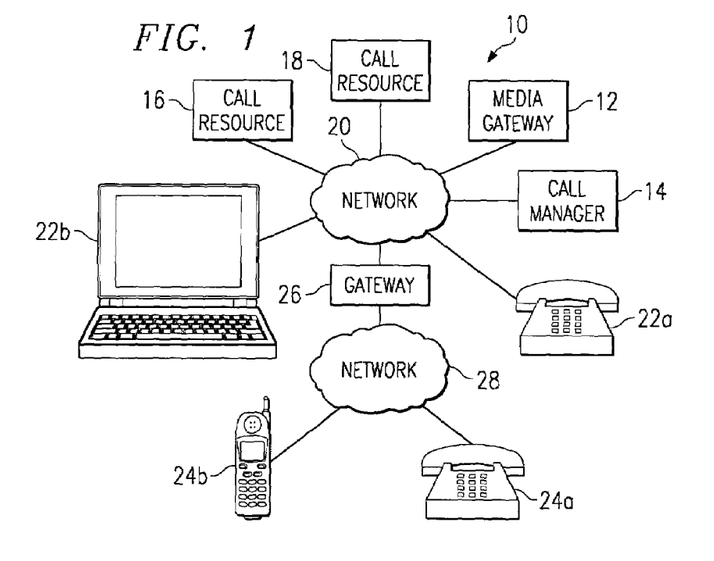
FIG. 1 illustrates a block diagram of a communication network that supports allocation of call resources during a conference call.

FIG. 1 illustrates a block diagram of a communication system 10 for allocating call resources 16 and 18 during a conference call. Although a specific communication network is illustrated in FIG. 1, the term "communication network" should be interpreted as generically defining any network capable of transmitting telecommunication signals, data and/or messages. In the illustrated embodiment, system 10 includes media gateway 12, call manager 14, call resources 16 and 18, and clients 22a and 22b coupled to network 20. System 10 further includes gateway 26 coupling network 20 to network 28. Clients 24a and 24b couple to network 28 and communicate with clients 22 via gateway 26. Clients 22 and 24, and gateway 26 may generally be referred to as clients 22. In one embodiment, media gateway 12 may transfer a conference call being conducted on call resource 16 to call resource 18 without terminating the conference call between two or more clients 22 and/or 24. In this manner, conference call participants may be oblivious to the transfer.

Network 20 may be a local area network (LAN), a wide area network (WAN), the Internet or other suitable network that transmits packets of voice, video, data and other information (generally referred to as media). In a particular embodiment, network 20 may be an Internet Protocol (IP) network. However, network 20 may be any type of network that allows transmission of audio and video telecommunication signals, as well as traditional data communications. Therefore, although subsequent description will primarily focus on IP communications, it should be understood that other appropriate methods of transmitting media over a network, such as a Frame Relay, Asynchronous Transfer Mode (ATM), or other packet-based network, are also included within the scope of the present invention.

Network 20 may be coupled to other IP networks and may communicate media between clients 22, and other clients located on different, but interconnected, IP networks. Network 20 may also be coupled to non-IP communication networks, such as network 28, through the use of gateway 26. For example, network 28 may be a private branch exchange (PBX), the public switched telephone network (PSTN) or a wireless network. Gateway 26 may digitize a telephone or data signal from network 28 if it is not already digitized, compress the digitized signal, and route it to a destination over network 20 in packet form. Gateway 26 may also convert packets of data into telephone or data signals that may be transmitted across network 28.

IP networks and other packet-based networks typically transmit media by placing the data in cells, packets, frames, or other portions of information (generally referred to as packets) and sending each packet individually to the selected destination. Unlike a circuit-switched network, such as the PSTN, dedicated bandwidth is not required for the duration of a conference call over network 20. Instead, clients 22 may send packets across network 20 as network 20 becomes available for transmission. This feature makes bandwidth available for additional communications when clients 22 are not communicating media.

The technology that allows voice media in particular to be transmitted over a packet-based network may be referred to as Voice over Packet (VoP). Clients 22 may have the capability to encapsulate a user's voice or other content into data packets so that the content may be transmitted over network 20. Clients 22 may, for example, include cordless or cellular telephones, personal digital assistants (PDAs), or other wireless devices. Also, clients 22 may include telephony software running on a computing device, traditional plain old telephone (POTS) devices, analog phones, digital phones, IP telephony devices, or other computing and/or communication devices that communicate media using analog and/or digital signals.

System 10 includes a call manager 14 that manages the overall establishment of conference calls. Call manager 14 is an application that controls call processing, routing, telephone features and options (such as call hold, call transfer, call waiting, and caller ID), device configuration, and other functions and parameters within network 20. Call manager 14 may control one or more of clients 22 coupled to networks 20 and 28. Call manager 14 may also control clients located on other networks communicating with network 20. Call manager 14 may be implemented as hardware and/or software executing on one or more computers coupled to network 20. The call manager software or logic may be embodied in any type of medium including, but not limited to, hard drives, diskettes, CD-ROMs, DVD-ROMs, optical or magnetic media, field programmable arrays (FPGAs), embedded processors, or any other suitable media.

Call resources 16 and 18 couple to network 20 at different physical locations. For example, network 20 may be a WAN, and call resource 16 may couple to network 20 in San Jose, Calif. and call resource 18 may couple to network 20 in Austin, Tex. Call resources 16 and 18 include multiple media processors to exchange and mix media streams associated with clients 22 participating in a conference call over network 20. Each media processor may conduct at least one conference call.

In one embodiment, call resources 16 and 18 receive media streams generated by clients 22 via media gateway 12, encode, decode, and/or transcode the media streams into a proper format using at least one of the media processors, and generate a number of mixed media streams for communication back to clients 22 via media gateway 12. The media streams received by call resources 16 and 18 and the mixed media streams communicated by call resources 16 and 18 may be in the form of media encoded in packets for communication using network 20. Clients 22 may receive the packets of information from media gateway 12 for presentation to conference participants.

In system 10, signaling to and from clients 22 during a conference call is first passed through call manager 14. Signaling between clients 22 and call manager 14 may be performed using any appropriate standards-based or proprietary signaling method, including, but not limited to, a direct signaling model, such as H.323, session initiation protocol (SIP) and/or media gateway control protocol (MGCP). Call manager 14 may provide signaling for the conference call and may instruct media gateway 12 to establish media streams and mixed media streams for clients 22.

System 10 also includes media gateway 12 that communicates media from clients 22 to available media processors in call resources 16 and 18. Media gateway 12 may be implemented as hardware and/or software executing on one or more computers coupled to network 20. The media gateway software may be embodied in any type of medium including, but not limited to, hard drives, diskettes, CD-ROMs, DVD-ROMs, other optical or magnetic, FPGAs, embedded processors, or any other suitable media.

In a conventional communication network, clients 22 may communicate media across networks 20 and 28 during a conference call. Call resources 16 and 18 receive the media communicated by clients 22 via media gateway 12, mix or process the media to generate mixed media, and communicate the mixed media to media gateway 12 for further communication to clients 22 to establish the conference call.

In the illustrated embodiment, media gateway 12 acts as a programmable flow controller for clients 22 and call resources 16 and 18. In order to establish a conference call, clients 22 communicate media to media gateway 12 over network 20. Media gateway 12 receives the media and may determine how to utilize call resources 16 and 18 based on the availability of call resources 16 and 18, and the number of participants in the conference call. For example, media gateway 12 may determine that call resource 16 is available to conduct the conference call between clients 22. Media gateway 12 then communicates the media from clients 22 to call resource 16. Call resource 16 mixes the media and communicates the mixed media to media gateway 12. Media gateway 12 receives the mixed media and communicates the mixed media to clients 22 using network 20 to establish the conference call. In this example, media gateway 12, rather than call resources 16 and 18, controls communication of media during the conference call.

Clients 22 may not be aware of call resources 16 and 18, so that all communication with clients 22 is performed via media gateway 12. In this embodiment, clients 22 establish calls using any suitable protocol, such as SIP and H.323, and these calls terminate at media gateway 12. Media gateway 12 may then establish and terminate separate communication sessions with call resources 16 and 18 using any suitable protocol, including proprietary techniques, without effecting communications between media gateway 12 and clients 22. In this manner, media gateway 12 operates as a proxy so that communication between media gateway 12 and clients 22 are not suspended when transferring conference calls between call resources.

During use, media gateway 12 also performs allocation of call resources 16 and 18 when multiple conference calls occur over network 20. In a conventional communication network, the media processors in call resources 16 and 18 may conduct one conference call between a maximum number of participants. In the illustrated embodiment, media gateway 12 may allocate call resources 16 and 18 such that the media processors in call resources 16 and 18 may conduct multiple conference calls if the total number of participants in the multiple conference calls is less than or equal to the maximum number of participants.

In one embodiment, the media processors in call resources 16 and 18 may conduct a conference call between a maximum of six participants. Clients 22 and 24 may initiate a first conference call on call resource 16. A media processor in call resource 16 may conduct the conference call since the number of participants is below six. If two or less clients on another network coupled to network 20 initiate a second conference call, media gateway 12 may direct the conference call to the media processor in call resource 16 that is conducting the first conference call. For example, media gateway 12 may direct the second conference call to call resource 16 if the first conference call has been in session for a maximum amount of time, e.g., approximately ten minutes, and there is a low probability of expanding the first conference call. Media gateway 12, therefore, may prevent under-utilization of call resources 16 and 18 by enabling the media processors in call resources 16 and 18 to conduct multiple conference calls.

Figure 2:
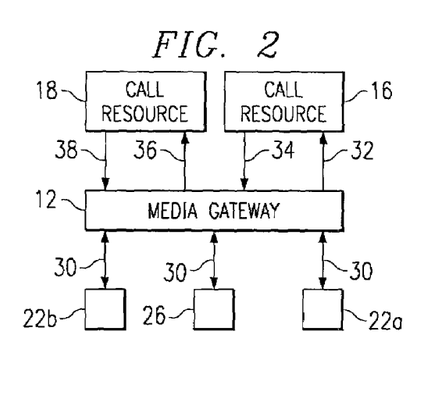
FIG. 2 illustrates a block diagram of communication between a media gateway and the call resources.

FIG. 2 illustrates a block diagram of communication occurring between clients 22, media gateway 12 and call resources 16 and 18. During a conference call, clients 22 communicate with media gateway 12 via media 30. Media 30 may include packets communicated from clients 22 to media gateway 12 and mixed packets communicated from media gateway 12 to clients 22. Media gateway 12 communicates with call resource 16 via first media 32 and first mixed media 34. First media 32 may include packets communicated from clients 22 and first mixed media 34 may include mixed packets communicated from call resource 16. Media gateway 12 communicates with call resource 18 in a similar way through second media 36 and second mixed media 38.

In operation, media gateway 12 may transfer a conference call between call resources 16 and 18 without notifying clients 22 that the transfer occurred and without the call participants being aware of the transfer. For example, call resource 16 may conduct a conference call over network 20 between clients 22. Media gateway 12 detects a transfer condition, such as a request to add an additional client to the conference call, a request by one of the participating clients to leave the conference call or initiation of a new conference call on call resource 16, and identifies call resource 18 as being available to conduct the conference call. Media gateway 12 duplicates first media 32 to create second media 36. Media gateway 12 then communicates second media 36 to call resource 18.

Call resource 16 mixes and processes first media 32 and call resource 18 mixes and processes second media 36. Call resource 16 communicates first mixed media 34 to media gateway 12 and call resource 18 communicates second mixed media 38 to media gateway 12. Media gateway 12 communicates first mixed media 34 to clients 22 using media 30 to maintain the conference call. Media gateway 12 modifies synchronization information associated with second mixed media 38 to match synchronization information associated with first mixed media 34. Once second mixed media 38 has been modified, media gateway 12 determines if the modified second mixed media is valid. In one embodiment, the modified second mixed media is valid when at least one packet is received from second mixed media 38 and has been modified to include the synchronization information from first mixed media 34. When the modified second mixed media is valid, media gateway 12 terminates first media 32 communicated to call resource 16 and first mixed media 34 communicated to clients 22. Media gateway 12 then utilizes the established conference call on call resource 18 by communicating the modified second mixed media to clients 22 via media 30.

In one embodiment, media gateway 12 receives a request by one of clients 22 to join a conference call that is conducted on call resource 16. If call resource 16 is unavailable to conduct the conference call with the additional participant, media gateway 12 transfers the conference call from call resource 16 to call resource 18. Media gateway 12 proceeds to transfer the conference call as described in the above example. In order to mask the transition between call resources 16 and 18, media gateway 12 plays a recorded prompt to users at clients 22 indicating that a new client has been added to the conference call. Media gateway 12 plays the prompt after it terminates the conference on call resource 16, eliminating first mixed media 34 communicated from call resource 16 to clients 22, but before it communicates second mixed media 38 from call resource 18 to clients 22 via media 30. Any glitches during the transfer, e.g., losing media, may be eliminated or reduced because clients 22 cannot receive second mixed media 38 from call resource 18 during the prompt.

In another embodiment, media gateway 12 receives a request by one of clients 22 to leave the conference call. Media gateway 12 determines that call resources 16 and 18 may be utilized more efficiently if the conference call is transferred from call resource 16 to call resource 18. As described above, media gateway 12 transfers the conference call and plays a recorded prompt to users at clients 22 indicating that a client has left the conference call. Media gateway 12 plays the prompt after it terminates first mixed media 34 communicated from call resource 16 to clients 22, but before it communicates second mixed media 38 from call resource 18 to clients 22 via media 30. The prompt masks the handoff between call resources 16 and 18 since no communication between clients 22 may occur during the prompt.

In a further embodiment, media gateway 12 receives a request to initiate a second conference call on call resource 16. Instead of directing the second conference call to call resource 18, media gateway 12 may transfer the first conference call from call resource 16 to call resource 18. Media gateway 12 transfers the first conference call as described above. Since the number of participants in the first conference call did not change, media gateway 12 transfers the first conference call when it detects a silence period. The users at clients 22 do not detect the transfer since no media is exchanged during the silence period, and communications between clients 22 and media gateway 12 are uninterrupted. Alternatively, the transfer may occur upon correlation of first and second mixed media 34 and 38. For example, some delay may have to be introduced, and first and second mixed media 34 and 38 timestamp adjusted to synchronize the streams of information. This may be done at media gateway 12 or at call resources 16 and 18, the sources of first and second mixed media 34 and 38. Upon properly synchronizing first and second mixed media 34 and 38, media gateway 12 may transfer the call without a silence period or masking prompt.

Figure 3:
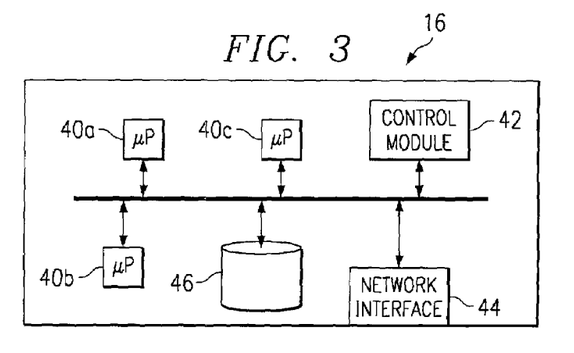
FIG. 3 illustrates a block diagram of a call resource that includes media processors for conducting the conference call.

FIG. 3 illustrates a block diagram of call resource 16. Although FIG. 3 is described with respect to call resource 16, call resource 18 may include the same components and perform the same functions. Call resource 16 includes media processors 40, control module 42, network interface 44, and memory 46. Network interface 44 may communicate with network 20, and may receive media 30 from clients 22 via media gateway 12 and signaling information from media gateway 12 and/or call manager 14.

Media processors 40 may exchange and mix media communicated from clients 22 to media gateway 12 over network 20. Media processors 40 may support the G.711, G.723, G.729 and other audio or video coding protocols. Media processors 40 operate with controllers, microprocessors, and/or digital signal processing (DSP) resources and may receive media streams from media gateway 12, encode, decode, and/or transcode the media streams into a proper format, and generate a number of mixed media streams for communication to clients 22 via media gateway 12. The media received by media processors 40 and the mixed media communicated by media processors 40 are in the form of media encoded in packets.

In one embodiment, media processor 40a may receive first media 32 from clients 22 via media gateway 12. Media processor 40a uses suitable signal processing techniques to mix first media 32 and produce first mixed media 34 for communication to clients 22 via media gateway 12. Each device participating in the conference call may receive a mixed media stream that includes contribution from all other devices except itself. For example if clients 22 and 24 participate in a conference call, client 22a receives a mixed media stream that includes contributions from clients 22b and 24. Similarly, client 24a receives a mixed media stream including contributions from clients 22 and 24b.

Control module 42 may provide overall control and management of multiple conference calls conducted using call resource 16. Specifically, control module 42 may provide administrative control, port assignment, admission control, command generation and receipt, and any other activities to control the conference call and direct media processors 40 to provide the appropriate signal processing. Control module 42 may direct first media 32 from media gateway 12 to one of media processors 40 conducting the conference call between clients 22. Control module 42 may also receive signaling information for the conference call from media gateway 12 and/or call manager 14. Memory 46 stores program instructions for execution by control module 42, and also provides storage for buffering first and second media 32 and 36 received from media gateway 12 and first and second mixed media 34 and 38 for communication to media gateway 12.

Figure 4:
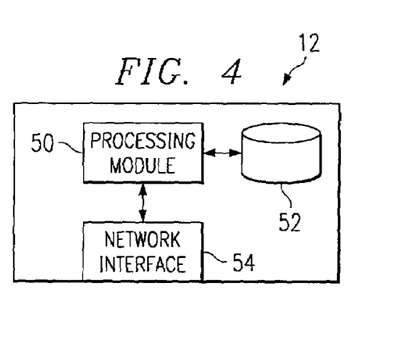
FIG. 4 illustrates a block diagram of a media gateway that allocates call resources during the conference call.

FIG. 4 illustrates a block diagram of media gateway 12 for allocating call resources 16 and 18 during a conference call. Media gateway 12 includes processing module 50, memory 52 and network interface 54. Memory 52 may be any suitable form of a volatile or non-volatile memory that is integral or separate from media gateway 12. Network interface 54 may communicate with network 20, and may receive media 30 from clients 22 and signaling information from call manager 14. Network interface 54 may be a physical port, virtual port, or other suitable direct or indirect connection that provides communication to clients 22 and call resources 16 and 18. Alternatively, media gateway 12 may include a dedicated interface to call resources 16 and 18, which may support a proprietary protocol and/or provide a common bus for communications with call resources 16 and 18. Processing module 50 may be one or a combination of a microprocessor, a microcontroller, a digital signal processor (DSP) or any other digital circuitry configured to process information.

In operation, processing module 50 determines if media processors 40 in call resources 16 and 18 are available to conduct a conference call. Although the following description discusses management and control activities of processing module 50 in media gateway 12, system 10 contemplates these management and control functions being performed by control modules 42 in call resources 16 and 18, processing module 50 in media gateway 12, or any suitable combination of control modules 42 and processing module 50. When processing module 50 receives a request to initiate a conference call, processing module 50 determines what media processors 40 are available in call resources 16 and 18. Once processing module 50 locates an available media processor, processing module 50 communicates media 30 from clients 22 and 24 to the available media processor via first media 32 and receives first mixed media 34 from the available media processor for communication to clients 22. Clients 22, therefore, are unaware of the call resource being used to conduct the conference call since clients 22 communicate directly with media gateway 12.

During use, processing module 50 in collaboration with control module 42 also allocates media processors 40 in call resources 16 and 18 when multiple conference calls are occurring over network 20. In a conventional communication network, media processors 40 in call resources 16 and 18 may conduct one conference call between a maximum number of participants. In the illustrated embodiment, processing module 50 may allocate call resources 16 and 18 such that media processors 40 may conduct multiple conference calls if the total number of participants in the multiple conference calls is less than or equal to the maximum number of participants.

In one embodiment, media processors 40 in call resources 16 and 18 may conduct a conference call having a maximum of six participants. Clients 22 and 24a may initiate a first conference call on call resource 16. Processing module 50 determines that media processor 40a in call resource 16 may conduct the conference call since the number of participants is below six. If three or less clients on another network coupled to network 20 initiate a second conference call on call resource 16, processing module 50 may direct the conference call to media processor 40a in call resource 16. For example, processing module 50 may determine that media processor 40a in call resource 16 may conduct the second conference call if the first conference call has been in session for a maximum amount of time, e.g., approximately ten minutes, and there is a low probability of expanding the number of participants in the first conference call. Processing module 50, therefore, may provide efficient utilization of media processors 40 in call resources 16 and 18 when multiple conference calls are being conducted over network 20.

During a conference call, processing module 50 may transfer the conference call between media processors 40 in call resources 16 and 18 without suspending or effecting communication between clients 22. In one embodiment, network 20 may be a packet-based network such as an IP network. Network 20 may further support packet switching in which media 30 communicated by clients 22 broken down into packets. The packets may contain a payload (the media to be transmitted), an originator, a destination and synchronization information. In one embodiment, the synchronization information may include sequence numbers and timestamps for the packets of media being communicated, and/or any other suitable information that may be used to assemble the packets in the correct order. In operation, clients 22 generate media 30 and transmit the packets of media over network 20. Each individual packet may be sent along the most optimal route to the destination. After call resources 16 and 18 mix the packets of media, clients 22 receive mixed media packets from media gateway 12 via media 30. Clients 22 then reassemble the packets based on the synchronization information in each packet. Although the packets may be sent in order, clients 22 may receive the packets in a different order and reassemble them in the correct order based on the synchronization information.

In another embodiment, media gateway 12 instructs call resources 16 and 18 to generate packets with specified timestamps and/or sequence numbers. Processing module 50 may request call resources to use an absolute timestamp and/or sequence number, or request an incremental adjustment in the timestamp and/or sequence number. In the latter case, processing module 50 can continue to command an adjustment in timestamp and/or sequence number until first and second mixed media 34 and 38 are synchronized. By commanding synchronization at the source of first and second mixed media 34 and 38, this approach reduces or eliminates processor-intensive reformatting of synchronization data on a per packet basis at media gateway 12.

Media processor 40a in call resource 16 may conduct a conference call by exchanging packets of media between clients 22. In this example, processing module 50 detects a transfer condition, such as a request to add an additional client to the conference call, a request by one of the participating clients to leave the conference call or initiation of a new conference call on call resource 16, and identifies media processor 40b in call resource 18 to conduct the conference call. Processing module 50 duplicates first packets associated with first media 32 communicated from media gateway 12 to media processor 40a in call resource 16 to create second media 36 containing second packets. Processing module 50 then communicates second packets via second media 36 to media processor 40b in call resource 18. Media processor 40a in call resource 16 mixes the first packets and media processor 40b in call resource 18 mixes the second packets. Call resource 16 communicates first mixed packets associated with first mixed media 34 to media gateway 12 and call resource 18 communicates second mixed packets associated with second mixed media 38 to media gateway 12.

In one embodiment, processing module 50 in media gateway 12 stores the synchronization information associated with the first mixed packets in memory 52 and communicates the first mixed packets from media processor 40a in call resource 16 to clients 22 via media 30 to maintain the conference call. Processing module 50 modifies the second mixed packets from media processor 40b in call resource 18 to contain synchronization information stored in memory 52. By modifying the second mixed packets to contain the synchronization information from the first mixed packets, clients 22 may assemble the second mixed packets in the correct order since the new synchronization information matches the original synchronization information. Clients 22 are oblivious that the physical location of the media mixing has changed from call resource 16 to call resource 18. If the second mixed packets were not modified, clients 22 may detect a discontinuity in the timestamp and/or sequence number of the packets received from media gateway 12. Without this synchronization operation, clients 22 may determine that the discontinuity represents a large amount of lost media packets and may terminate media 30.

Once the second mixed packets have been modified, processing module 50 terminates first mixed media 34. Processing module 50 may measure the relative delay between first and second mixed media 34 and 38, and instruct an appropriate media processor 40 to insert a delay to equalize the timing between first and second mixed media 34 and 38. Processing module 50 establishes the conference call on media processor 40b in call resource 18 by communicating the modified second mixed packets to clients 22 via media 30.

In one embodiment, processing module 50 receives a request by one of clients 22 to join the conference call. If media processors 40 in call resource 16 are unavailable to conduct the conference call with the additional participant, processing module 50 may transfer the conference call from media processor 40a in call resource 16 to media processor 40b in call resource 18 as described in the example above. Processing module 50 determines that the conference call may be transferred when at least one second mixed packet has been received from media processor 40b in call resource 18 for second mixed media 38 and modified to contain the synchronization information from at least one first mixed packet from first mixed media 34.

In order to mask the transition between call resources 16 and 18, processing module 50 may play a recorded prompt to users at clients 22 indicating that a new client has been added to the conference call. Processing module 50 plays the prompt after it terminates first mixed media 34 communicated from media processor 40a in call resource 16, but before processing module 50 communicates the second mixed packets associated with second mixed media 38 from media processor 40b in call resource 18.

Processing module 50 further adjusts the synchronization information for the modified second mixed packets to compensate for the prompt packets being played out. In one embodiment, processing module 50 increments the sequence number and timestamp for the second mixed packets from second mixed media 38 to compensate for the packets of recorded voice information associated with the prompt. The sequence numbers and timestamps are adjusted so clients 22 do not detect a discontinuity in the packets received from media gateway 12. Without synchronizing timestamps and/ or sequence numbers, existing communication protocols, such as RTP, may interpret the discontinuity in timestamps and/or sequence numbers as packets that were dropped in transmission from the source to the destination. By adjusting the timestamps and/or sequence numbers, clients 22 do not detect a discontinuity in the packets and may assemble the second mixed packets and the prompt packets in the correct order so that no media is lost during the transfer of the conference call from call resource 16 to call resource 18.

In another embodiment, processing module 50 receives a request by one of clients 22 to exit the conference call. Processing module 50 may determine that media processors 40 in call resources 16 and 18 may be utilized more efficiently if the conference call is transferred from media processor 40*a* in call resource 16 to media processor 40*b* in call resource 18. As described above, processing module 50 transfers the conference call and plays a recorded prompt to users at clients 22 indicating that a client has left the conference call. Processing module 50 plays the prompt after it terminates first mixed media 34 communicated from media processor 40*a* in call resource 16, but before it communicates the second mixed packets associated with second mixed media 38 from media processor 40*b* in call resource 18. As described above, processing module 50 adjusts the synchronization information for the modified second mixed packets to compensate for the prompt packets being played out. The prompt masks the handoff between media processor 40*a* in call resource 16 and media processor 40*b* in call resource 18 since no media may be communicated by clients 22 during the prompt.

In a further embodiment, processing module 50 may receive a request to initiate a second conference call on media processor 40*a* in call resource 16. Instead of directing the second conference call to call resource 18, processing module 50 may transfer the first conference call from media processor 40*a* in call resource 16 to media processor 40*b* in call resource 18. Processing module 50 determines that the first conference call may be transferred when the modified second mixed packets are the same as the first mixed packets. To make this determination, processing module 50 analyzes and correlates the modified second mixed packets and the first mixed packets. If needed, processing module 50 instructs media processors 40*a* and/or 40*b* to add delay to synchronize timing between first and second mixed media 34 and 38. Since the number of participants in the first conference call did not change, processing module 50 transfers the first conference call during a period of silence. The users at clients 22 do not detect the transfer since no packets may be communicated during the silence period.

Figure 5:
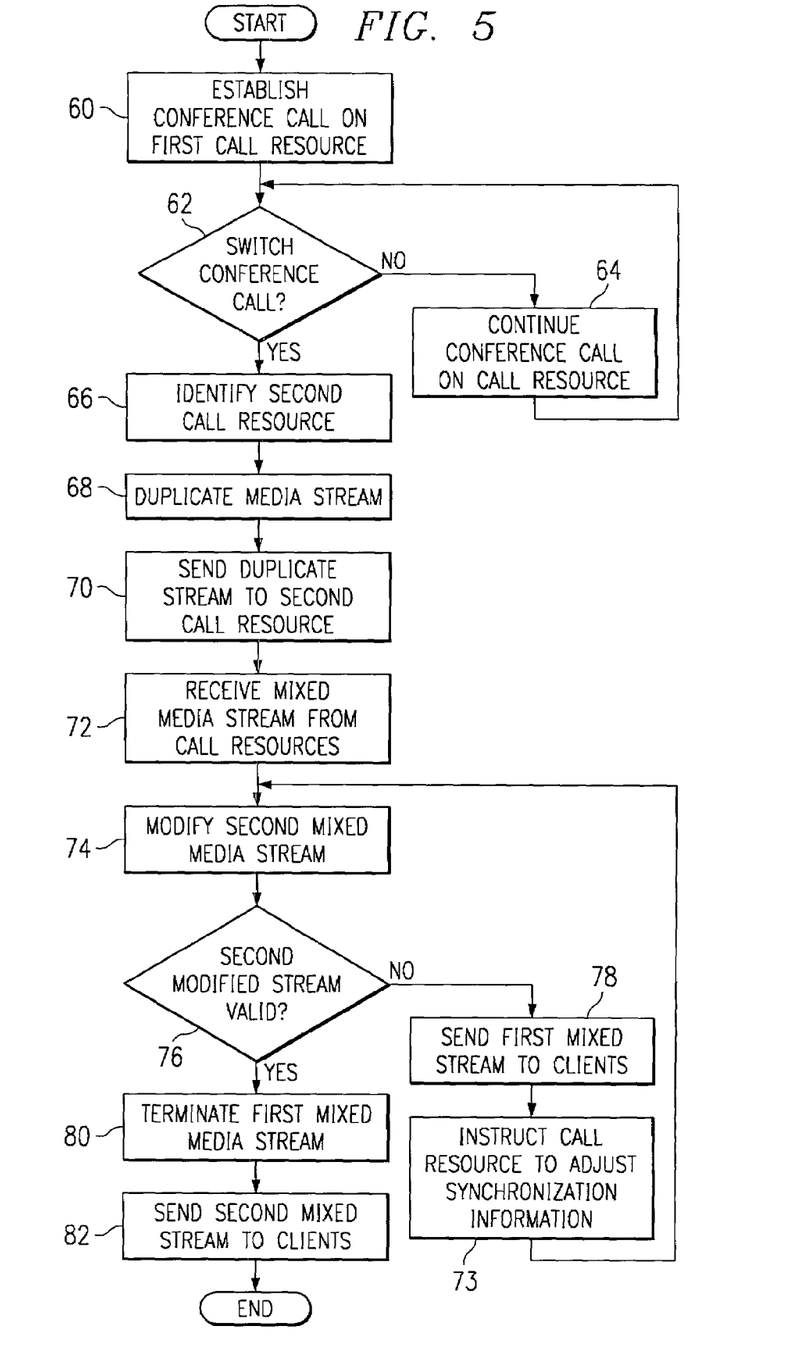
FIG. 5 illustrates a flowchart of a method for allocating call resources during the conference call.

FIG. 5 illustrates a flowchart of a method for allocating call resources 16 and 18 during a conference call. In one embodiment, network 20 may support communication using the real-time transport protocol (RTP) or any suitable protocol for transporting real-time data, such as audio or video, over network 20. RTP provides end-to-end delivery services for packets of media. Each RTP packet within a media stream contains a payload and a header. The payload is the data being transported by the packet and the header that provides a synchronization source (SSRC) number, a sequence number, and timing information for that packet. The SSRC number uniquely identifies the source of the packet. All packets from an SSRC form a part of the same timing and sequence number space such that a destination client may group packets by SSRC number for reassembly. The sequence number increments by one for each RTP packet and allows the destination client to reconstruct the source's packet sequence in the proper order. The timestamp indicates when the packet was generated. It is important to maintain the SSRC number, sequence numbers and timestamps so that the packets may be assembled at the destination in the correct order. If the packets are not assembled in the correct order, the destination client may drop the packets and terminate the conference call if a large number of packets are dropped.

At step 60, media gateway 12 may establish a conference call on media processor 40*a* in call resource 16 by communicating RTP packets from clients 22. Media processor 40*a* mixes the RTP packets and communicates mixed RTP packets to clients 22 via media gateway 12 to establish the conference call. If media gateway 12 does not receive a signal to transfer the conference call at step 62, media gateway 12 continues to communicate RTP packets from clients 22 to media processor 40*a* in call resource 16 to maintain the conference call at step 64. If media gateway 12 determines to transfer the conference call at step 62, media gateway 12 identifies a media processor on an available call resource 18 at step 66.

In one embodiment, media gateway 12 may determine that media processor 40*b* in call resource 18 is available to conduct the conference call. At step 68, media gateway 12 duplicates first media 32 that contains multiple first RTP packets to create second media 36 that contains multiple second RTP packets. Media gateway 12 communicates second media 36 to media processor 40*b* in call resource 18 at step 70 for processing and mixing. Call resource 18 generates a unique SSRC number, which is different than the SSRC number for first media 32, for second media 36 and creates sequence numbers and timestamps for each second RTP packet associated with second media 36. Media processor 40*a* in call resource 16 mixes and processes the first RTP packets associated with first media 32 and media processor 40*b* in call resource 18 mixes and processes the second RTP packets associated with second media 36.

At step 72, media gateway 12 simultaneously receives first mixed media 34 and second mixed media 38 respectively from media processor 40*a* in call resource 16 and media processor 40*b* in call resource 18. Since the SSRC numbers, sequence numbers and timestamps associated with the first and second mixed RTP packets are different, media gateway 12 modifies the second mixed RTP packets at step 74 to match the first mixed RTP packets. In one embodiment, media gateway 12 modifies the second mixed RTP packets by removing the SSRC numbers, sequence numbers, and timestamps associated with second mixed media 38 and adding the SSRC numbers, sequence numbers and timestamps stored in memory 52 associated with the first mixed media packets. The second mixed RTP packets associated with second mixed media 38 are modified so that clients 22 continue to receive mixed RTP packets having the same SSRC numbers and sequence numbers. If the second mixed RTP packets were not modified, clients 22 may not be able to assemble the packets in the correct order and data may be lost. Furthermore, a large amount of lost data packets may cause clients 22 to terminate the conference call.

At step 76, media gateway 12 determines if the modified second mixed media stream may be communicated to clients 22 via media 30. If the information in the modified second mixed RTP packets is not valid, media gateway 12 continues to communicate the first mixed RTP packets associated with first mixed media 34 from media processor 40*a* in call resource 16 to clients 22 via media 30 at step 78. Media gateway 12 may also instruct call resource 18 to adjust timestamps and/or sequence numbers associated with second mixed media 38 to match synchronization information associated with first mixed media 34 at step 73, and modify second mixed media 38 accordingly at step 74. This process may be repeated until first and second mixed media 34 and 38 are synchronized. Alternatively, media gateway 12 may modify synchronization information locally as packets of second mixed media 38 are received from call resource 18.

If the information in the modified second mixed RTP packets is valid, media gateway 12 terminates first mixed media 34 from media processor 40a in call resource 16 at step 80 and communicates the modified second mixed RTP packets associated with second mixed media 38 to clients 22 via media 30 at step 82. Once clients 22 receive the second mixed RTP packets, communication is established with media processor 40b in call resource 18 and media processor 40a in call resource 16 is available to conduct another conference call.

In one embodiment, media gateway 12 determines that the modified second mixed RTP packets contain valid information when at least one second mixed RTP packet has been received and modified for each second mixed media 38 communicated by media processor 40b in call resource 18.

In an alternative embodiment, media gateway 12 determines that the modified second mixed RTP packets contain valid information when the synchronization information in the modified second mixed RTP packets match the synchronization information in the first mixed RTP packets. In this case, there may be dissimilar delay between the second mixed RTP packets and the first mixed RTP packets. Media gateway 12 may insert an appropriate delay to equalize the time of arrival of the first and second mixed RTP packets. Alternatively, media gateway 12 may instruct call resource 16 and/or 18 to insert a delay in first mixed media 34 and/or second mixed media 38 to equalize the time-of-arrival of media at media gateway 12. Media gateway 12 may continue to communicate the first mixed RTP packets to clients 22 until a match is obtained. When the delay for the first mixed RTP packets matches the delay for the modified second mixed RTP packets, media gateway 12 terminates first mixed media 34 and communicates the modified second mixed media 38 to clients 22 via media 30.

Figure 6:
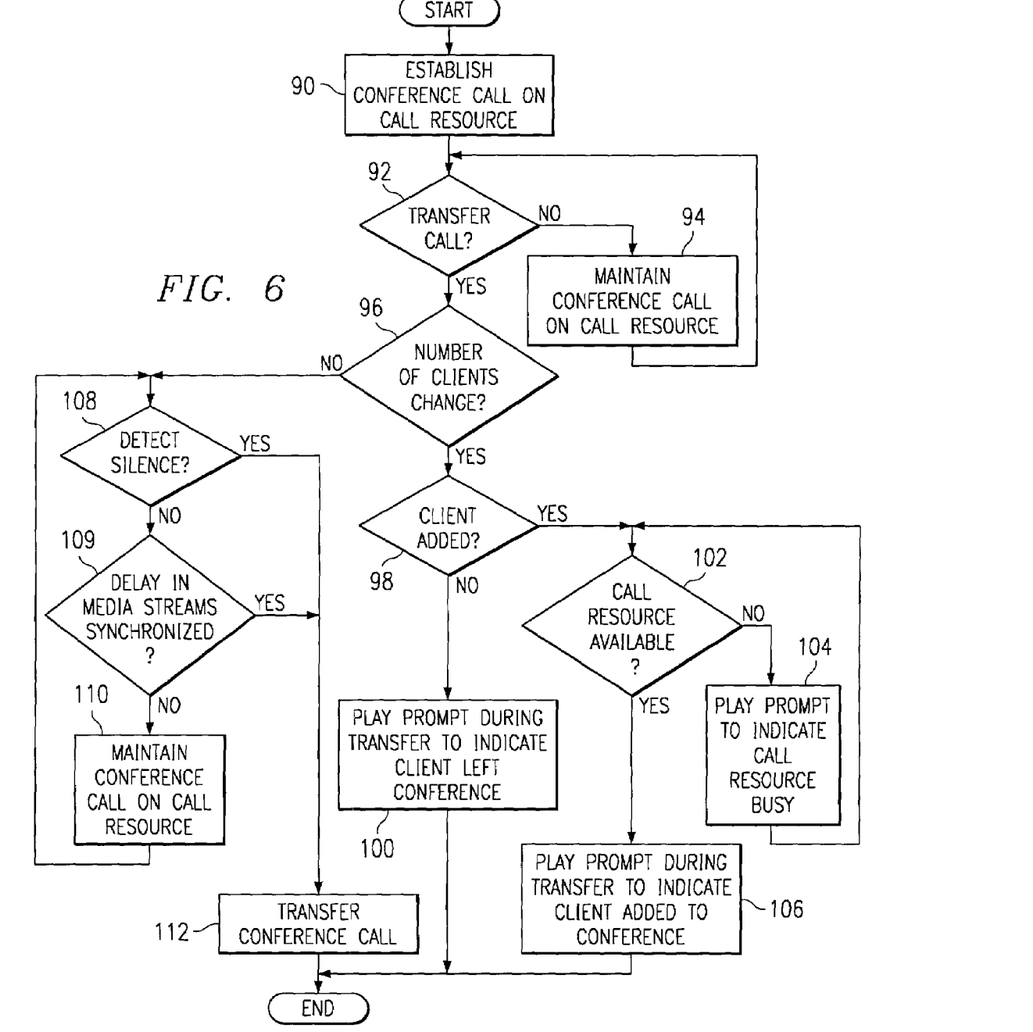
FIG. 6 illustrates a flowchart of a method for conducting a transfer of the conference call.

FIG. 6 illustrates a flowchart of a method for conducting a transfer of a conference call between call resources 16 and 18. Media gateway 12 may establish the conference call on call resource 16 at step 90. Media gateway 12 determines at step 92 if the conference call should be transferred to another call resource. If media gateway 12 determines that no transfer is necessary, media gateway 12 maintains the conference call on call resource 16 at step 94.

If media gateway 12 detects that the conference call should be transferred, media gateway 12 determines if the number of clients participating in the conference call has changed at step 96. If the number of clients did change, media gateway 12 determines if an additional client joined the conference call at step 98. If one of the participants left the conference call, media gateway 12 simultaneously transfers the conference call and plays a recorded prompt to users at clients 22 at step 100. The prompt indicates that one of the participants has left the conference call. If an additional client requested to join the conference call, media gateway 12 determines if call resource 18 is available to conduct the conference call with the additional participant at step 102. If call resource 18 is not available to conduct the conference call, media gateway 12 plays a recorded prompt to a user at the additional client at step 104. The prompt asks the user to make another request to join the conference call because call resources 16 and 18 were unavailable when the first request was made. If call resource 18 is available to conduct the conference call and an additional client requests to join the conference call, media gateway 12 simultaneously transfers the conference call and plays a recorded prompt to users at clients 22 at step 106. The prompt indicates that an additional client has joined the conference call.

If the number of clients participating in the conference call did not change and media gateway 12 determines that the conference call should be transferred, media gateway 12 determines if there is a period of silence in the conference call at step 108. If media gateway 12 does not detect a period of silence, media gateway 12 determines if the delay for first mixed media 34 generated by call resource 16 is synchronized with the delay for second mixed media 38 generated by call resource 18 at step 109. In an alternative embodiment, media gateway 12 may determine if the delays for first and second mixed media 34 and 38 match in addition to or in lieu of playing a prompt or detecting a period of silence in the conference call. If the delays for first and second mixed media 34 and 38 do not match, media gateway 12 continues the conference call on call resource 16 at step 110. If media gateway 12 detects a period of silence at step 108, or determines that the delay for first mixed media 34 matches the delay for second mixed media 38 at step 109, media gateway 12 transfers the conference call from call resource 16 to call resource 18 at step 112.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for allocating a plurality of call resources during a conference call, comprising:
   conducting a conference call between three or more clients using a first call resource;
   identifying a second call resource available to conduct the conference call;
   transferring the conference call from the first call resource to the second call resource without suspending communication of a plurality of mixed media streams received by the clients; and
   wherein transferring comprises:
      generating a first mixed media stream at the first call resource and a second mixed media stream at the second call resource;
      modifying synchronization information in the second mixed media stream to match synchronization information in the first mixed media stream;
      terminating the first mixed media stream to end communication with the first call resource upon confirming that the modified second mixed media stream is valid; and
      communicating the modified second mixed media stream to the clients.

2. The method of claim 1, further comprising introducing a delay in a selected one of the first mixed media stream and the second mixed media stream to synchronize the first mixed media stream and the second mixed media stream.

3. The method of claim 1, wherein modifying synchronization information comprises:
   instructing the second call resource to adjust synchronization information in the second mixed media stream; and
   receiving the second mixed media stream with the adjusted synchronization information.

4. The method of claim 1, wherein synchronization information comprises at least a selected one of a timestamp and a sequence number.

5. The method of claim 1, wherein:
the first mixed media stream comprises a first sequence of real-time transport protocol (RTP) packets;
the second mixed media stream comprises a second sequence of RTP packets; and
the modified second mixed media stream is valid when the second sequence of RTP packets matches the first sequence of RTP packets.

6. The method of claim 1, wherein the clients are unaware of the transfer of the conference call from the first call resource to the second call resource.

7. A method for allocating a plurality of call resources during a conference call, comprising:
conducting a conference call between three or more clients using a first call resource;
identifying a second call resource available to conduct the conference call;
transferring the conference call from the first call resource to the second call resource without suspending communication of a plurality of mixed media streams received by the clients; and
wherein conducting the conference call comprises:
communicating, to the first call resource, a first media stream generated by one of the clients participating in the conference call; and
communicating, to the one of the clients, a first mixed media stream received from the first call resource;
transferring the conference call comprises:
duplicating the first media stream to create a second media stream;
communicating the second media stream to the second call resource;
receiving a second mixed media stream from the second call resource;
terminating the first mixed media stream to end communication with the first call resource upon confirming that a modified second mixed media stream is valid;
communicating the modified second mixed media stream to the one of the clients; and
further comprising:
instructing the second call resource to adjust synchronization information in the second mixed media stream; and
receiving the second mixed media stream with the adjusted synchronization information.

8. A communication system, comprising:
three or more clients operable to couple to a packet-based network, the clients further operable to initiate or join a conference call;
a first call resource operable to couple to the packet based network;
a second call resource operable to couple to the packet-based network at a different physical location than the first call resource;
a media gateway operable to couple to the packet-based network, the media gateway further operable to transfer the conference call from the first call resource to the second call resource without suspending communication of a plurality of mixed media streams received by the clients; and
wherein:
the first call resource is further operable to generate a first mixed media stream;
the second call resource is further operable to generate a second mixed media stream;
the media gateway is further operable to:
modify synchronization information in the second mixed media stream to match synchronization information in the first mixed media stream;
terminate the first mixed media stream to end communication with the first call resource upon confirming that the modified second mixed media stream is valid; and
communicate the modified second mixed media stream to the clients.

9. The communication system of claim 8, wherein the media gateway is further operable to introduce a delay in a selected one of the first mixed media stream and the second mixed media stream to synchronize the first mixed media stream and the second mixed media stream.

10. The communication system of claim 8, wherein the media gateway modifies synchronization information by:
instructing the second call resource to adjust synchronization information in the second mixed media stream; and
receiving the second mixed media stream with the adjusted synchronization information.

11. The communication system of claim 8, wherein the synchronization information comprises at least a selected one of a timestamp and a sequence number.

12. The communication system of claim 8, wherein
the first mixed media stream comprises a first sequence of real-time transport protocol (RTP) packets;
the second mixed media stream comprises a second sequence of RTP packets; and
the modified second mixed media stream is valid when the second sequence of RTP packets matches the first sequence of RTP packets.

13. The communication system of claim 8, wherein the clients are unaware of the transfer of the conference call from the first call resource to the second call resource.

14. The communication system of claim 8, wherein the plurality of clients are selected from a group consisting essentially of a conventional telephone coupled to the packet-based network via a gateway, a wireless phone coupled to the packet-based network via the gateway, an Internet Protocol (IP) phone or a computer including a voice teleconferencing application.

15. The communication system of claim 8, wherein the packet-based network comprises an Internet Protocol (IP) network.

16. A communication system, comprising:
three or more clients operable to couple to a packet-based network, the clients further operable to initiate or join a conference call;
a first call resource operable to couple to the packet-based network;
a second call resource operable to couple to the packet-based network at a different physical location than the first call resource;
a media gateway operable to couple to the packet-based network, the media gateway further operable to transfer the conference call from the first call resource to the second call resource without suspending communication of a plurality of mixed media streams received by the clients;
wherein one of the clients participating in the conference call is operable to communicate a first media stream to the first call resource;

wherein the first call resource is further operable to communicate a first mixed media stream to the one of the clients; and the media gateway is further operable to:
- duplicate the first media stream to create a second media stream;
- communicate the second media stream to the second call resource;
- receive a second mixed media stream from the second call resource;
- terminate the first mixed media stream to end communication with the first call resource upon confirming that a modified second mixed media stream is valid;
- communicate the modified second mixed media stream to the one of the clients;
- instruct the second call resource to adjust synchronization information in the second mixed media stream; and
- receive the second mixed media stream with the adjusted synchronization information.

17. A media gateway, comprising:
- an interface operable to couple to a communication network, the interface further operable to receive media streams communicated by three or more clients participating in a conference call;
- a processing module coupled to the interface, the processing module operable to transfer the conference call from a first call resource to a second call resource without suspending communication of a plurality of mixed media streams received by the clients; and
- wherein the processing module is further operable to:
  - receive a first mixed media stream generated by the first call resource and a second mixed media stream generated by the second call resource;
  - modify synchronization information in the second mixed media stream to match synchronization information in the first mixed media stream;
  - terminate the first mixed media stream to end communication with the first call resource upon confirming that the modified second mixed media stream is valid; and
  - communicate the modified second mixed media stream to the clients.

18. The media gateway of claim 17, wherein the processing module is further operable to introduce a delay in a selected one of the first mixed media stream and the second mixed media stream to synchronize the first mixed media stream and the second mixed media stream.

19. The media gateway of claim 17, wherein the processing module modifies synchronization information by:
- instructing the second call resource to adjust synchronization information in the second mixed media stream; and
- receiving the second mixed media stream with the adjusted synchronization information.

20. The media gateway of claim 17, wherein the synchronization information comprises at least a selected one of a timestamp and a sequence number.

21. The media gateway of claim 17, wherein:
- the first mixed media stream comprises a first sequence of real-time transport protocol (RTP) packets;
- the second mixed media stream comprises a second sequence of RTP packets; and
- the modified second mixed media stream is valid when the second sequence of RTP packets matches the first sequence of RTP packets.

22. The media gateway of claim 17, wherein the clients are unaware of the transfer of the conference call from the first call resource to the second call resource.

23. A media gateway, comprising:
- an interface operable to couple to a communication network, the interface further operable to receive media streams communicated by three or more clients participating in a conference call;
- a processing module coupled to the interface, the processing module operable to transfer the conference call from a first call resource to a second call resource without suspending communication of a plurality of mixed media streams received by the clients; and
- wherein the processing module is further operable to:
  - communicate a first media stream generated by one of the clients participating in the conference call to the first call resource;
  - communicate a first mixed media stream received from the first call resource to the one of the clients;
  - duplicate the first media stream to create a second media stream;
  - communicate the second media stream to the second call resource;
  - receive a second mixed media stream from the second call resource;
  - terminate the first mixed media stream to end communication with the first call resource upon confirming that a modified second mixed media stream is valid;
  - communicate the modified second mixed media stream to the one of the clients;
  - instruct the second call resource to adjust synchronization information in the second mixed media stream; and
  - receive the second mixed media stream with the adjusted synchronization information.

24. Logic encoded in media for allocating a plurality of call resources during a conference call and operable to perform the following steps:
- conducting a conference call between three or more clients using a first call resource;
- identifying a second call resource available to conduct the conference call;
- transferring the conference call from the first call resource to the second call resource without suspending communication of a plurality of mixed media streams received by the clients; and
- wherein transferring comprises:
  - generating a first mixed media stream at the first call resource and a second mixed media stream at the second call resource;
  - modifying synchronization information in the second mixed media stream to match synchronization information in the first mixed media stream;
  - terminating the first mixed media stream to end communication with the first call resource upon confirming that the modified second mixed media stream is valid; and
  - communicating the modified second mixed media stream to the clients.

25. The logic encoded in media of claim 24, further comprising introducing a delay in a selected one of the first mixed media stream and the second mixed media stream to synchronize the first mixed media stream and the second mixed media stream.

26. The logic encoded in media of claim 24, wherein modifying synchronization information comprises:

instructing the second call resource to adjust synchronization information in the second mixed media stream; and receiving the second mixed media stream with the adjusted synchronization information.

27. The logic encoded in media of claim 24, wherein synchronization information comprises at least a selected one of a timestamp and a sequence number.

28. The logic encoded in media of claim 24, wherein:
the first mixed media stream comprises a first sequence of real-time transport protocol (RTP) packets;
the second mixed media stream comprises a second sequence of RTP packets; and
the modified second mixed media stream is valid when the second sequence of RTP packets matches the first sequence of RTP packets.

29. The logic encoded in media of claim 24, wherein the clients are unaware of the transfer of the conference call from the first call resource to the second call resource.

30. Logic encoded in media for allocating a plurality of call resources during a conference call and operable to perform the following steps:
conducting a conference call between three or more clients using a first call resource;
identifying a second call resource available to conduct the conference call;
transferring the conference call from the first call resource to the second call resource without suspending communication of a plurality of mixed media streams received by the clients;
wherein conducting the conference call comprises:
communicating, to the first call resource, a first media stream generated by one of the clients participating in the conference call; and
communicating, to the one of the clients, a first mixed media stream received from the first call resource; and
wherein transferring the conference call comprises:
duplicating the first media stream to create a second media stream;
communicating the second media stream to the second call resource;
receiving a second mixed media stream from the second call resource;
terminating the first mixed media stream to end communication with the first call resource upon confirming that a modified second mixed media stream is valid;
communicating the modified second mixed media stream to the clients;
instructing the second call resource to adjust synchronization information in the second mixed media stream; and
receiving the second mixed media stream with the adjusted synchronization information.

31. An apparatus for allocating a plurality of call resources during a conference call, comprising:
means for conducting a conference call between three or more clients using a first call resource;
means for identifying a second call resource available to conduct the conference call;
means for transferring the conference call from the first call resource to the second call resource without suspending communication of a plurality of mixed media streams received by the clients;
means for generating a first mixed media stream at the first call resource and a second mixed media stream at the second call resource;
means for modifying synchronization information in the second mixed media stream to match synchronization information in the first mixed media stream;
means for terminating the first mixed media stream to end communication with the first call resource upon confirming that the modified second mixed media stream is valid; and
means for communicating the modified second mixed media stream to the clients.

* * * * *